United States Patent
Stolze

(10) Patent No.: US 11,572,869 B2
(45) Date of Patent: Feb. 7, 2023

(54) MECHANICAL ACTUATOR SYSTEM AND EOAT DEVICE HAVING SUCH AN ACTUATOR SYSTEM

(71) Applicant: FIPA Holding GmbH, Ismaning (DE)

(72) Inventor: Michael Stolze, Buch am Buchrain (DE)

(73) Assignee: FIPA Holding GMBH, Ismaning (DE)

(*) Notice: Subject to any disclaimer, the term of this patent is extended or adjusted under 35 U.S.C. 154(b) by 4 days.

(21) Appl. No.: 17/284,063

(22) PCT Filed: Oct. 8, 2019

(86) PCT No.: PCT/EP2019/077207
§ 371 (c)(1),
(2) Date: Apr. 9, 2021

(87) PCT Pub. No.: WO2020/078773
PCT Pub. Date: Apr. 23, 2020

(65) Prior Publication Data
US 2021/0404452 A1 Dec. 30, 2021

(30) Foreign Application Priority Data
Oct. 15, 2018 (EP) .................................. 18200383

(51) Int. Cl.
*F03G 7/06* (2006.01)
*B25J 9/10* (2006.01)
*B25J 15/00* (2006.01)

(52) U.S. Cl.
CPC .......... *F03G 7/0645* (2021.08); *B25J 9/1085* (2013.01); *B25J 15/00* (2013.01); *F03G 7/0614* (2021.08)

(58) Field of Classification Search
CPC ......................................................... F03G 7/06
See application file for complete search history.

(56) References Cited

U.S. PATENT DOCUMENTS

| 5,306,979 A | 4/1994 | Schwarz, Jr. |
| 5,312,152 A * | 5/1994 | Woebkenberg, Jr. ... F03G 7/065 60/528 |
| 7,188,473 B1 | 3/2007 | Asada et al. |

(Continued)

FOREIGN PATENT DOCUMENTS

| CN | 102017022 A | 4/2011 |
| CN | 105228535 A | 1/2016 |

(Continued)

OTHER PUBLICATIONS

English Translation DE 19740091 A1 (Year: 1997).*

(Continued)

*Primary Examiner* — Shafiq Mian
(74) *Attorney, Agent, or Firm* — Boardman Clark LLP

(57) ABSTRACT

Disclosed is a mechanical actuator system for generating a force needed for actuating an actuating member of an EOAT device as required. The actuator system has at least one functional unit which is designed to change the dimension of the functional unit reversibly in a preferred direction (R) of the functional unit when energy is supplied. The invention further relates to an EOAT device, in particular in the form of a gripper or of a cutting tool, having at least one actuating member and an actuator system associated with the at least one actuating member.

20 Claims, 5 Drawing Sheets

(56) References Cited

U.S. PATENT DOCUMENTS

Figure 1:
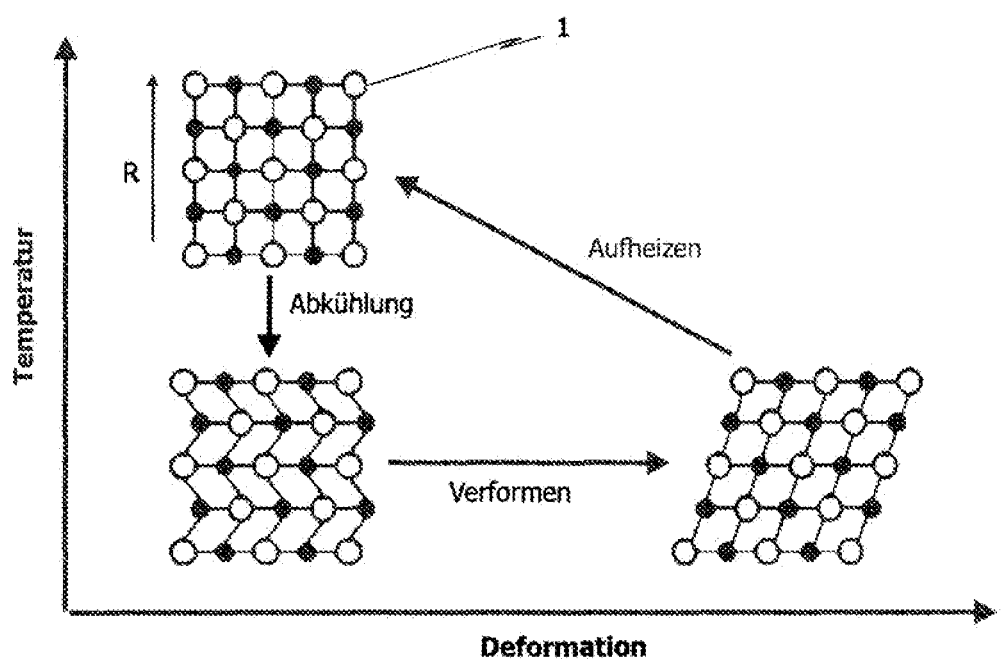

| | | | | |
|---|---|---|---|---|
| 7,665,300 | B2* | 2/2010 | Biggs | H01H 37/323 |
| | | | | 60/528 |
| 8,661,810 | B2* | 3/2014 | Browne | F03G 7/065 |
| | | | | 60/528 |
| 2009/0218858 | A1 | 9/2009 | Lawall et al. | |
| 2009/0226691 | A1* | 9/2009 | Mankame | D07B 5/00 |
| | | | | 428/222 |
| 2011/0253664 | A1* | 10/2011 | Grubba | A63H 19/18 |
| | | | | 213/75 TC |
| 2014/0060036 | A1* | 3/2014 | Gao | F01P 7/10 |
| | | | | 60/527 |
| 2017/0000507 | A1* | 1/2017 | Conlon | A61B 17/3421 |

FOREIGN PATENT DOCUMENTS

| | | | | |
|---|---|---|---|---|
| DE | 19738296 | | 3/1999 | |
| DE | 19740091 | | 3/1999 | |
| DE | 19740091 | A1 * | 3/1999 | B25J 15/02 |
| DE | 19932987 | | 1/2001 | |
| DE | 10030224 | | 12/2001 | |
| DE | 102008038813 | | 2/2009 | |
| EP | 2500146 | | 9/2012 | |

OTHER PUBLICATIONS

International Search Report of the International Searching Authority dated Nov. 29, 2019 for PCT/EP2019/077207 (translated).
International Preliminary Report on Patentability of the International Searching Authority dated Feb. 5, 2021 for PCT/EP2019/077207 (translated).

* cited by examiner

MECHANICAL ACTUATOR SYSTEM AND EOAT DEVICE HAVING SUCH AN ACTUATOR SYSTEM

CROSS-REFERENCE TO RELATED APPLICATIONS

This application is a national phase filing of International Patent Application No. PCT/EP2019/077207, entitled "Mechanical Actuator System and EOAT Device Having Such an Actuator System", which has an international filing date of Oct. 8, 2019, which claims priority to European Patent Application No. 18200383.0 filed Oct. 15, 2018, the entire contents of each of which is hereby incorporated herein by reference for all purposes.

BACKGROUND OF THE INVENTION

The present invention relates in general to working members, particularly for robots. This includes actuators/effectors but also necessary auxiliary devices like wrist axes, exchange systems, joining aids, protective devices and sensor units.

Specifically, the invention relates to mechanical actuator systems for actuating working members of a robot, whereby the actuator systems are characterized by their small overall size and are thus particularly suitable for miniature working members of a robot. The invention further relates to corresponding working members of a robot having such a miniature actuator system.

According to embodiments of the invention, same relates primarily to so-called EOAT devices (EOAT=end-of-arm-tooling), particularly in the form of a gripper or a cutting tool, having at least one actuating member and a miniature actuator system allocated to the at least one actuating member.

EOAT devices, for example in the form of gripping tongs, are generally known from gripper technology. Such EOAT devices are usually pneumatically operated devices such as, for example, pneumatically operated gripping tongs, whereby the devices have a housing in which a normally pneumatically operated linear drive is formed. The EOAT devices further comprise at least one actuating member such as, for example, a gripper jaw, whereby said at least one actuating member is coupled to the linear drive such that a linear motion generated by the linear drive is converted into a corresponding pivoting or displacing movement of the actuating member.

EOAT devices of this type, such as for example gripping tongs, are frequently used in conjunction with industrial robots for the handling of various types of objects/components/workpieces. Maximum reliability of the actuating member is essential so that the object or the component/workpiece can on the one hand be safely processed or held by the actuating member of the EOAT device. On the other hand, there is an increasing trend toward realizing the most compact possible EOAT devices, and in particular actuating members of the EOAT devices, wherein the weight of the EOAT device is to be reduced so that the devices can be used in a wide variety of applications, especially in robotics.

A typical example of such an EOAT device is gripping tongs, these fulfilling the function of grasping and holding and establishing the connection between a robot arm and the workpiece to be processed. The decisive factors for a secure connection are thereby the type of effective pairing and the number of contact levels. The effective pairing can be achieved via force, form or material pairing. When force pairing is used, the hold is created by exerting a pressure on the workpiece surface. In contrast thereto, the hold in form pairing ensues by means of a form-mated girdling of the workpiece. Industry has to date only used these processes to a limited extent, whereby however there are signs of change, especially in the case of microassembly.

Yet the degree of increased miniaturization possible with known EOAT devices is generally not infinite. One reason for this is the overall size of the linear drive allocated to an EOAT device via which the at least one actuating member of the EOAT device is to be actuated. In order to ensure that a sufficiently high enough force can be generated with the linear drive, the linear drives used to this point, which are usually pneumatically operated linear drives, necessarily exhibit a certain minimum size. Moreover, the necessary pneumatic connections for supplying the linear drive impede any downscaling of the known EOAT devices.

On the other hand, the need for miniature EOAT devices is growing steadily.

BRIEF SUMMARY OF THE INVENTION

On the basis of this problem as set forth, the present invention is based on the task of specifying a solution which enables virtually any miniaturization of EOAT devices so as to significantly expand the performance spectrum of EOAT devices.

To solve this task, the invention proposes a novel mechanical actuator system for EOAT devices. Specifically proposed is a mechanical actuator system for generating a force required to actuate an actuating member of an EOAT device as needed, wherein said mechanical actuator system—unlike the normally used pneumatic linear drives—is of particularly small design and can in particular be nearly integrally incorporated into an EOAT device. To that end, the actuator system comprises at least one functional unit designed to reversibly change its dimensions in a preferred direction of the functional unit when energy is supplied. In other words, the invention proposes a completely new approach to actuating the actuating members of an EOAT device. In contrast to a "classic" motor (electric, pneumatic or hydraulic), which necessitates a certain minimum size by virtue of its working principle, the actuator system according to the invention has a functional unit formed from a material of a nature such that upon energy being supplied (heat, electrical energy, light, etc.), it reversibly changes its dimensions in a preferred direction of the material, or functional unit respectively.

For example, conceivable in this context is the at least one functional unit of the inventive actuator system being formed from a material having shape memory properties, wherein the functional unit is designed to reversibly change its dimensions in the preferred direction of the functional unit when heat is supplied. The dimensional change of the functional unit thus generates a force which can be directly or indirectly used to actuate the at least one actuating member of the EOAT device.

Materials having shape memory properties such as shape-memory polymers (SMP) or shape-memory alloys (SMA) are those materials able to change shape from a set temporarily adopted shape to an originally adopted (permanent) shape when heated above a transition temperature or in response to another external stimulus. The material is first brought into its permanent shape using conventional processing methods. The material is then deformed and fixed into the desired temporary shape. This process is also called "programming."

Programming can include for example heating the material, a high-temperature deformation and cooling process, or low-temperature deformation ("cold stretching"). While in the current temporary shape, the permanent shape is now retained. When the material is heated to a temperature above the transition temperature, the shape memory effect is triggered and thus a reverting to the retained permanent shape.

So that the at least one functional unit with the shape memory material can also be used cyclically, a further development of the present invention provides for the functional unit to be allocated a first electrode unit and a second electrode unit, whereby a polymer layer comprising a dielectric elastomer with shape memory properties is arranged between the first and second electrode unit. A control unit in contact with the first and second electrode unit is furthermore provided. The control unit is designed to apply an electrical voltage between the first and the second electrode unit and also allow an electric current to flow through the first and/or second electrode unit.

This embodiment of the inventive actuator system uses two properties of the employed polymer layer which are able to be actualized by differing control of the electrodes. An electric current flowing through the first and/or second electrode unit realizes resistive heating. The polymer can in this way be heated for programming. The actual programming occurs by applying an electrical voltage, and thus also an electrical field, between the first and the second electrode unit. This results in a deformation of the dielectric elastomer, or the corresponding functional unit respectively. After adopting the temporary shape, the polymer is activated by an electric current again flowing through the first and/or second electrode unit and thus heating the polymer. These processes can be repeated so as to enable a cyclical use of the shape memory polymer as a functional unit of the actuator system.

However, the present invention is not limited to actuator systems in which the at least one functional unit has a dielectric elastomer or polymer with shape memory properties. In fact, it is conceivable for the at least one functional unit to also work in corresponding manner with shape memory alloys. The at least one functional unit can to that end be realized as a tubular monolithic SMA actuator made from a tubular monolithic SMA substrate of, for example, NiTi, CuAlNi, CuAl, CuZnAl, TiV or TiNb.

The functional unit realized as a tubular monolithic SMA actuator can comprise a first end, a second end and a middle section and can be obtained from a substrate having e.g. a circular, elliptical, rectangular or irregular cross section. The middle section forms an actuator pattern which maintains its uniformity and electrical conductivity over the course of the pattern from the first to the second end. The actuator pattern may be any pattern, for example a meander pattern or a zigzag pattern. A first electrode can be formed at the first end and a second electrode at the second end of the actuator.

In one method for operating such an actuator, an electric current is applied to the actuator, this heats the actuator and in so doing leads to a bending of the actuator.

Alternatively thereto, however, it is also conceivable for the at least one functional unit of the actuator system to be formed from a material having piezoelectric properties, whereby the functional unit is designed to reversibly change its dimensions in the preferred direction of the functional unit upon an electrical voltage being applied in order to thereby generate a force which can be used to actuate the at least one actuating member of the EOAT device.

According to embodiments of the inventive actuator system, the at least one functional unit exhibits an elastic soft polymer core between two flexible electrodes. When electrical voltage is applied between the flexible electrodes, the two electrodes attract each other and squeeze the soft polymer core between them. Because polymers are virtually incompressible, the elastomer expands laterally as a result. This lateral expansion thereby corresponds to a change in the dimensions of the functional unit in the preferred direction such that the force thereby generated can be used to actuate at least one actuating member of an EOAT device.

When the electrical voltage between the two flexible electrodes then decreases, the sandwich reverts to its original form. In other words, the at least one functional unit then contracts and assumes its initial shape.

In a similar realization of the inventive actuator system, a functional unit of elastic plastic which reassumes its original form after deformation is used as the functional unit (elastomer). Alternatively thereto, however, it is also conceivable for the functional unit to be formed from thin, highly flexible polymer/plastic films, whereby these films are for example filled with electrically non-conductive (insulating) liquids. This creates a hydraulic element coated with a gel which is highly flexible and conducts electrical charges; e.g. a saline water-swollen gel.

Upon an electrical voltage now being applied to the hydraulic element, an electric field builds up which penetrates the various layers of the hydraulic element and exerts an electrostatic force on the liquid. The soft shell of the hydraulic element is thereby deformed and motions or respectively forces are generated which can be used to actuate the at least one actuating member of an EOAT device.

Common to all of the above-described embodiments is that the functional unit can be of extremely small and very flexible design as regards its dimensions. Functional units in the millimeter or smaller size range are thus conceivable.

This enables miniaturizing the entire EOAT device. On the other hand, the functional units are nevertheless designed to generate a sufficiently high enough force, particularly when a plurality of interacting functional units are employed.

A further advantage to be noted is that the EOAT devices no longer need to be connected to pneumatic lines; an electrical power supply is instead normally sufficient to supply the functional units with energy.

In order increase the force able to be generated by the actuator system, implementations of the present invention provide for a plurality of functional units each connected in series in their preferred direction in order to thus form a fibriform or strand-like functional group. All the functional units of a functional group are able to be activated upon energy being supplied such that the total travel of the functional group thereby generated is composed of a sum of all the individual travel of the functional group's individual functional units.

Alternatively or additionally thereto, it is conceivable for two functional units to be arranged parallel to one another in such a way that upon energy being supplied, the total force generated by the at least two parallel-arranged functional units corresponds to a sum of the individual forces able to be generated by the at least two functional units when energy is supplied.

The actuator system can thus be specifically adapted to the respective application by selectively connecting the individual functional units in series or in parallel. Finely adjustable forces can also be generated with the actuator system.

For example, it is also conceivable in this context for the actuator system to have a first group of functional units and a second group of functional units, whereby the first and the second group are each actuatable independent of one another by correspondingly supplying energy to the functional units of the respective group. The functional unit of the first group is for example designed to contract in the preferred direction of the respective functional unit upon energy being supplied, whereby the functional unit of the second group is designed to expand in the preferred direction of the respective functional unit upon energy being supplied.

On the other hand, it is however also conceivable to be able to use the status data of a functional unit in order to be able to assess the status of an actuating member of the EOAT device. This can be realized when at least one functional unit is realized as a passive sensor unit designed to output a corresponding electrical signal indicative of the status of an actuating member of the EOAT device associated with the functional unit as a function of a change in the dimensions of the functional unit in its preferred direction.

The invention not only relates to a mechanical actuator system of the afore-mentioned type but also to the use of such an actuator system as a mechanical drive of an actuating member of an EOAT device.

The invention furthermore relates to a corresponding EOAT device, particularly in the form of a gripper or a cutting tool having at least one actuating member and an actuator system of the aforementioned type allocated to the at least one actuating member.

BRIEF DESCRIPTION OF THE SEVERAL VIEWS OF THE DRAWING(S)

The following will reference the accompanying drawings in describing embodiments of the present invention in greater detail.

Figure 2:
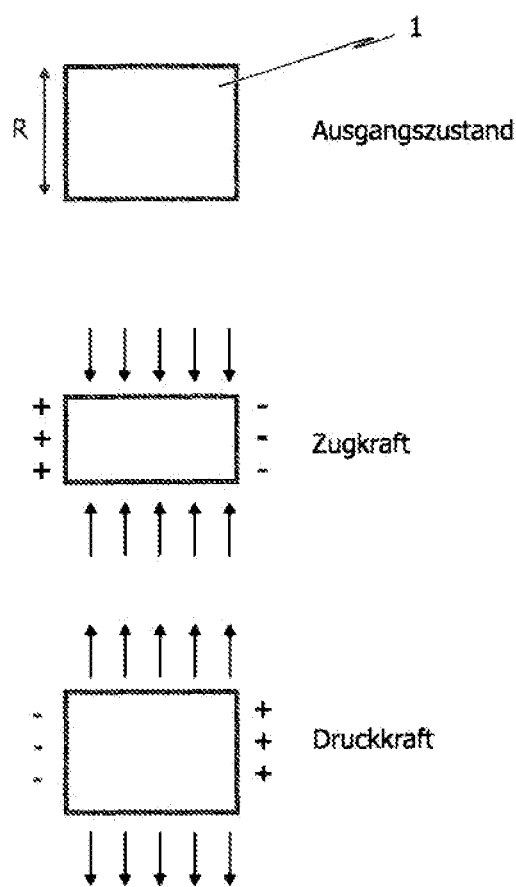
Figure 3:
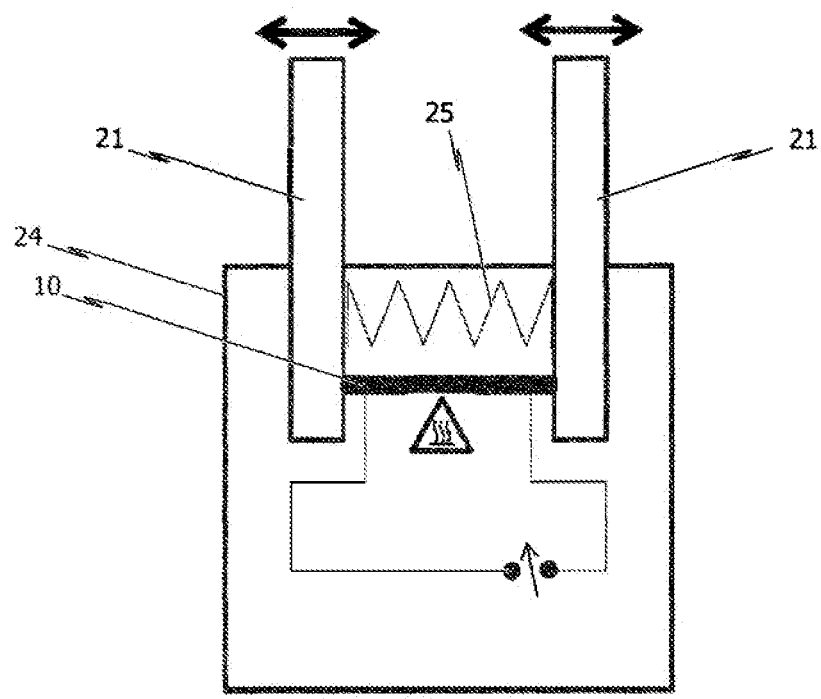
Figure 4:
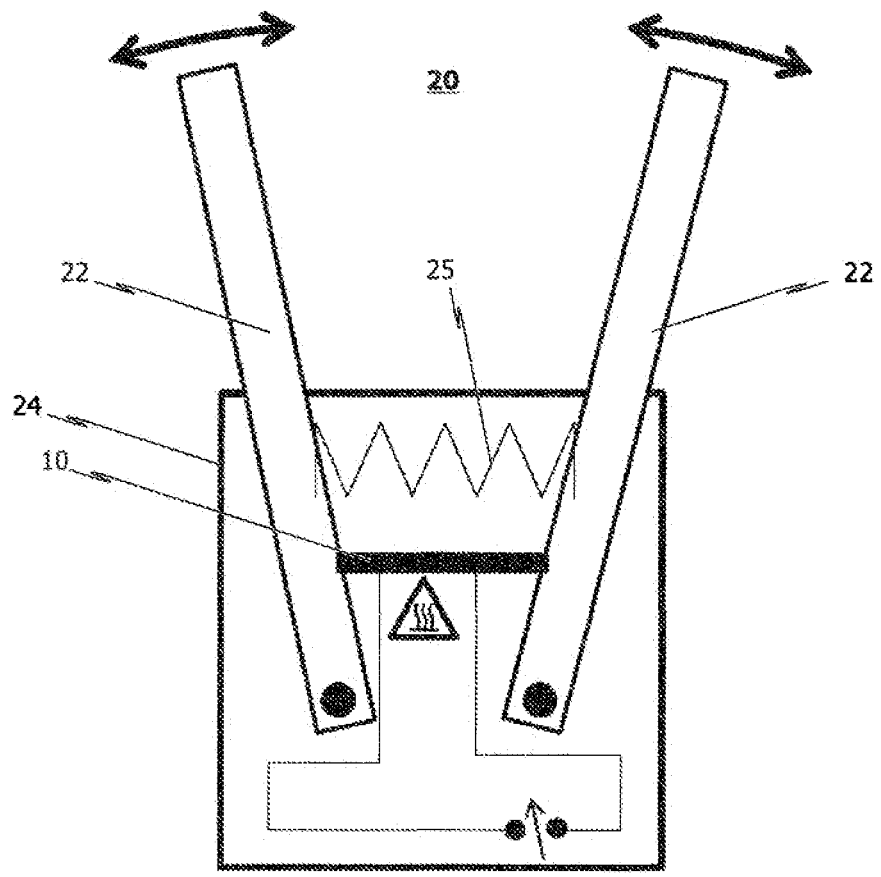
Figure 5:
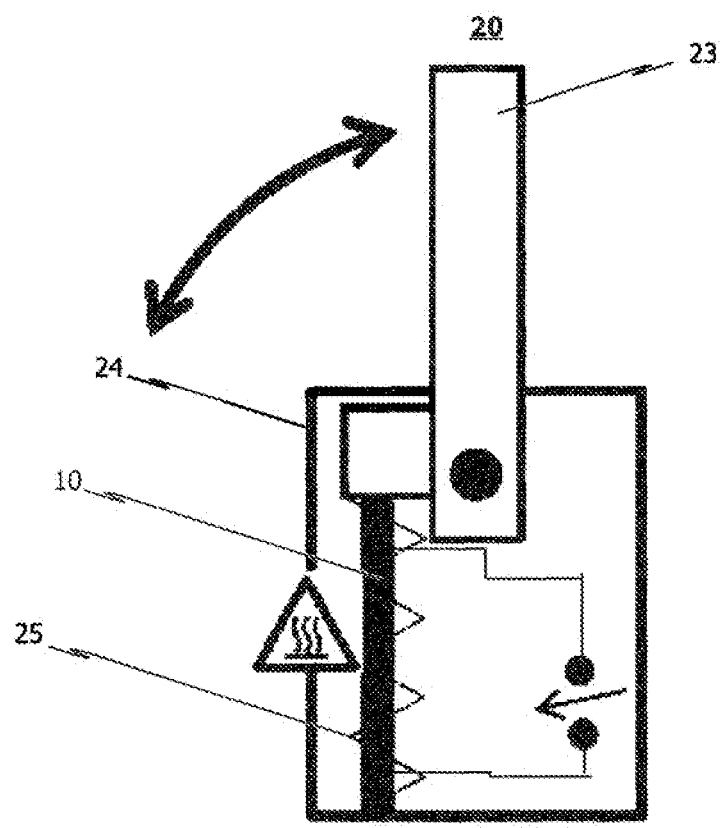

Shown are:

FIG. 1 a schematic view of a shape memory alloy phase structure and phase transformation for describing a working principle of an exemplary embodiment of the inventive actuator system;

FIG. 2 a schematic view of the mode of operation of another exemplary embodiment of the inventive actuator system;

FIG. 3 a schematic view of a first exemplary embodiment of an EOAT device having an embodiment of the inventive actuator system;

FIG. 4 a schematic view of a second exemplary embodiment of an EOAT device having an embodiment of the inventive actuator system; and FIG. 5 a schematic view of a third exemplary embodiment of an EOAT device having an embodiment of the inventive actuator system.

DETAILED DESCRIPTION OF THE INVENTION

FIG. 1 schematically depicts the basic principle of an exemplary embodiment of the actuator system 10 according to the invention. At least one functional unit 1 formed from a metal alloy having shape memory properties is used in this embodiment of the inventive actuator system 10.

Shape memory alloys are characterized in that they exhibit two different structures (phases) depending on temperature. The shape transformation is thereby based on temperature-dependent lattice transformation to one of these two crystal structures. Generally speaking, there is the high-temperature phase called austenite and the martensite (low-temperature phase). Both can give way to one another through a change in temperature (two-way effect).

The structural transformation is independent of the speed of the temperature change. To initiate the phase transition, the temperature and mechanical stress parameters are equivalent; i.e. the transformation can be induced not only thermally but also by mechanical stress.

Preferably used as the material of the at least one functional unit 1 of the inventive actuator system 10 is a shape memory alloy which "remembers" two shapes—one at high temperature and one at low temperature—due to the two-way effect. So that the functional unit 1 readopts its defined initial shape upon cooling, it needs to be "trained" through thermomechanical treatment cycles. This causes stress fields to develop in the material, which promotes the formation of certain martensite variants upon cooling. The trained cold state shape thus only represents a preferred shape of the martensite structure. In the case of the intrinsic two-way effect, however, the shape transformation can only occur when there are no counteracting external forces. In other words, the functional unit 1 is unable to perform work upon cooling.

A return spring is therefore frequently used according to embodiments of the inventive EOAT device 20, as will be described in greater detail below in conjunction with the exemplary embodiments shown in FIGS. 3 to 5.

In FIG. 2, the mode of operation of a further exemplary embodiment of the inventive actuator system 10 is described schematically. The actuator system 10 in this embodiment comprises functional unit 1 which is formed from a material having piezoelectric properties, wherein the functional unit 1 is designed to reversibly change its dimensions in the preferred direction R of the functional unit 1 upon application of an electrical voltage.

This functional unit 1 utilizes the piezoelectric effect which characterizes the change in electrical polarization and thus the occurrence of an electrical voltage on solids when elastically deformed (direct piezo effect). In contrast, for the functional unit 1 to be able to generate a force required to actuate an actuating member when an electrical voltage is applied, the functional unit 1 utilizes the inverse piezo effect in which the material of the functional unit 1 is correspondingly deformed upon application of an electrical voltage.

Since a functional unit 1 based on the piezoelectric effect can be selectively operated using the direct or inverse piezoelectric effect, the functional unit 1 is suited to being used either as an active functional unit 1 for generating a force or as a passive sensor unit for outputting a corresponding electrical signal.

FIG. 3 schematically shows a first exemplary embodiment of an EOAT device 20 according to the invention. The exemplary embodiment of the EOAT device 20 according to FIG. 3 is realized as a parallel gripper. The parallel gripper has two gripper jaw carriers 21 arranged side-by-side which can move linearly relative to each other between an open position and a closed position by approaching or distancing from one another in exertion of working motions.

To actuate these actuating members (here: gripper jaw carriers 21), a mechanical actuator system 10 according to the present invention is arranged in a housing 24 of the parallel gripper. This actuator system 10 exhibits a plurality of functional units which are arranged in series and/or parallel to one another and designed to reversibly change their dimensions in a preferred direction R of the functional units upon energy being supplied, for example upon an electrical voltage being applied or when heat is supplied.

In the exemplary embodiment schematically shown in FIG. 3, the preferred direction R of the functional units of the mechanical actuator system 10 corresponds to the direction of movement of the gripper jaw carriers 21.

Different configurations and functional principles are possible as functional units. For example, the functional units of the actuator system 10 can be formed from a material with shape memory properties, the functional principle of which has been described above with reference to the illustration in FIG. 1. Alternatively or additionally thereto, however, it is also conceivable for the functional units to be based on the piezoelectric effect, as was explained above with reference to the illustration in FIG. 2.

However, it is in principle also conceivable to use a plurality of elastic polymer cores, each arranged between two flexible electrodes, as functional units, whereby upon an electrical voltage being applied to the respective electrodes, they attract each other and push the soft polymer core in the direction of the preferred direction R of the functional unit 1.

Of particular advantage is for the mechanical actuator system 10 to have a plurality of functional units connected in parallel and/or in series so as to increase the force able to be generated when energy is supplied or increase the total travel respectively.

A return spring 25 is used in the embodiment of the inventive EOAT device 20 depicted schematically in FIG. 3 which returns the gripper jaw carriers 21 to their initial position as soon as the functional units of the actuator system 10 are no longer being acted upon with electrical voltage.

However, in place of such a mechanical return spring 25, it is also conceivable for the actuator system 10 to exhibit first functional units which, when supplied with energy, generate a force which moves the gripper jaw carriers 21 of the parallel gripper into their open position, whereby the actuator system 10 further exhibits second functional units which, when energized, generate a force which moves the gripper jaw carriers 21 into their closed position.

A second exemplary embodiment of the inventive EOAT device 20 is schematically depicted in FIG. 4. In this second exemplary embodiment, the EOAT device 20 is realized as gripping tongs. The gripping tongs exhibit a housing 24 in which an embodiment of the inventive actuator system 10 is accommodated. The gripping tongs further exhibit a first and a second gripper jaw 22, each mounted so as to be pivotable about a rotational axis relative to the housing 24. The first and second gripper jaws 22 are thereby coupled to the actuator system 10 integrated in the housing 24 such that a linear motion generated by the actuator system 10 is converted into a respective pivoting movement of the first and second gripper jaws 22 in an opening or closing direction of the gripper jaws 22.

As is also the case with the exemplary embodiment of the inventive EOAT device 20 schematically depicted in FIG. 3, a return spring 25 is likewise used with the gripping tongs according to FIG. 4 in order to return the gripper jaws 22 to their closed position when the functional units of the actuator system 10 are not being energized.

It is of course also conceivable in this embodiment to dispense with such a spring 25 and provide first or respectively second functional units which generate forces in opposite directions when actuated.

A third exemplary embodiment of the inventive EOAT device 20 is shown schematically in FIG. 5. This being a gripper finger having a gripping means 23 as an actuating member which is designed to pivot within a pivot range between an open position and a closed position. In the open position, the gripper finger can be brought close to an object to be grasped. The gripping means then pivots into the closed position in which the gripper finger grasps the object. In this state, a gripping surface of the gripping means lies against the object. The object can subsequently be transported. When the object is to be released again, the gripping means 23 is pivoted back into the open position again.

To actuate the gripping means, an actuator system 10 according to the present invention is integrated into the housing 24 of the gripper finger. The structure and mode of operation of said actuator system 10 correspond to the previously described embodiments.

It is to be noted at this point that the present invention is in no way limited to EOAT devices 20 in the form of parallel grippers, gripping tongs or finger grippers. Rather, the exemplary embodiments according to the illustrations in FIGS. 3 to 5 only serve to illustrate aspects of the present invention. Thus, it is for example also conceivable for the inventive actuator system 10 to be used in e.g. a needle gripper or in other EOAT devices 20.

The inventive actuator system 10, which is used for example in a parallel gripper, in gripping tongs or in a gripping finger to generate a force required to actuate a gripping member when needed, is also particularly characterized by being designed to receive EOAT device 20 status data and emit corresponding signals to an evaluation device.

Specifically, according to embodiments of the present invention, it is provided for the inventive actuator system 10 to have at least one functional unit 1 used selectively or continuously as a passive sensor system. Upon a change in dimensions of the functional unit 1 in its preferred direction R, a corresponding electrical signal is generated via the material of the functional unit 1, e.g. utilizing the direct piezo effect. This electrical signal is indicative of the force generated by the actuator system 10 or the position of the gripping members associated with the actuator system 10 respectively.

Furthermore, the sensor signal output by the functional unit 1 operated as a passive sensor element can be used not only for status control but also to detect whether an object (workpiece) has been properly grasped by the EOAT device 20.

The invention is not limited to the embodiments depicted in the drawings but rather yields from an integrated overall consideration of all the features disclosed herein.

The invention claimed is:

1. An end-of-arm-tooling (EOAT) device in the form of gripping tongs having two gripper jaws or in the form of a parallel gripper having two gripper jaw carriers, wherein the EOAT device comprises an actuator system allocated to the gripper jaws or the gripper jaw carriers for the generating of a force needed to actuate the gripper jaws or the gripper jaw carriers as needed, wherein the actuator system comprises a plurality of functional units, wherein each of the plurality of functional units is designed to reversibly change its dimensions in a preferential direction of the plurality of functional units when energy is supplied, wherein at least one of:
    at least two functional units are respectively connected in series in their preferential direction to form a fibriform or strand-like functional group, wherein all the at least two functional units of a functional group are able to be activated upon energy being supplied such that the total travel of the functional group thereby generated is composed of a sum of all the individual travel of individual functional units of the functional group, and the at least two functional units are arranged parallel to one another such that upon energy being supplied, the total force generated by the at least two functional units corresponds to a sum of the individual forces able to be generated by the at least two functional units when energy is supplied.

2. The EOAT device according to claim 1, wherein the at least two functional units are formed from a first material having shape memory properties, and wherein the at least two functional units are designed to reversibly change dimensions in the preferential direction of the at least two functional units when heat is supplied.

3. The EOAT device according to claim 2, wherein the first material is a dielectric elastomer, a dielectric polymer or a metal alloy, in particular nitinol.

4. The EOAT device according to claim 1, wherein at least two functional units are formed from a second material having piezoelectric properties, and wherein the at least two functional units are designed to reversibly change dimensions in the preferential direction of the at least two functional units upon application of an electrical voltage.

5. The EOAT device according to claim 1, wherein the at least two functional units having electroactive polymer properties, and wherein the at least two functional units are designed to reversibly change dimensions in the preferential direction of the at least two functional units upon application of an electrical voltage.

6. The EOAT device according to claim 1, wherein the at least two functional units of a group contract in the preferential direction of respective functional units of the first group upon energy being supplied, and wherein the at least two functional units of a second group expand in the preferential direction of respective functional units of the second group upon energy being supplied.

7. The EOAT device according to claim 1, wherein at least one functional unit is designed as a passive sensor unit designed to output a corresponding electrical signal as a function of a change in the dimensions of the functional unit in its preferential direction.

8. An end-of-arm-tooling (EOAT) device in the form of gripping tongs having two gripper jaws or in the form of a parallel gripper having two gripper jaw carriers, wherein the EOAT device comprises an actuator system allocated to the gripper jaws or the gripper jaw carriers for the generating of a force needed to actuate the gripper jaws or the gripper jaw carriers as needed, wherein the actuator system comprises a plurality of functional units, wherein each of the plurality of functional units is designed to reversibly change its dimensions in a preferential direction of the plurality of functional units when energy is supplied, wherein the EOAT device has a first group of functional units and a second group of functional units, wherein the first and the second group are each actuatable independent of one another by correspondingly supplying energy to the at least two functional units of the respective group, wherein at least one of:

at least two functional units are respectively connected in series in their preferential direction to form a fibriform or strand-like functional group, wherein all of the at least two functional units of a functional group are able to be activated upon energy being supplied such that the total travel of the functional group thereby generated is composed of a sum of all the individual travel of individual functional units of the functional group, and the at least two functional units are arranged parallel to one another such that upon energy being supplied, the total force generated by the at least two parallel-arranged functional units corresponds to a sum of the individual forces able to be generated by the at least two functional units when energy is supplied.

9. The EOAT device according to claim 8, wherein the at least two functional units are formed from a first material having shape memory properties, and wherein the at least two functional units are designed to reversibly change dimensions in the preferential direction of the at least two functional units when heat is supplied.

10. The EOAT device according to claim 9, wherein the first material is a dielectric elastomer, a dielectric polymer or a metal alloy, in particular nitinol.

11. The EOAT device according to claim 8, wherein at least two functional units are formed from a second material having piezoelectric properties, and wherein the at least two functional units are designed to reversibly change dimensions in the preferential direction of the at least two functional units upon application of an electrical voltage.

12. The EOAT device according to claim 8, wherein the at least two functional units having polymer properties, and wherein the at least two functional units are designed to reversibly change dimensions in the preferential direction of the at least two functional units upon application of an electrical voltage.

13. The EOAT device according to claim 8, wherein the at least two functional units of the first group contract in the preferential direction of the respective functional units of the first group upon energy being supplied, and wherein the at least two functional units of the second group expand in the preferential direction of the respective functional units of the second group upon energy being supplied.

14. The EOAT device according to claim 8, wherein at least one functional unit is designed as a passive sensor unit designed to output a corresponding electrical signal as a function of a change in the dimensions of the functional unit in its preferential direction.

15. An end-of-arm-tooling (EOAT) device in the form of gripping tongs having two gripper jaws or in the form of a parallel gripper having two gripper jaw carriers, wherein the EOAT device comprises an actuator system allocated to the gripper jaws or the gripper jaw carriers for the generating of a force needed to actuate the gripper jaws or the gripper jaw carriers as needed, wherein the actuator system comprises a plurality of functional units, wherein each of the plurality of functional units is designed to reversibly change its dimensions in a preferential direction of the plurality of functional unit when energy is supplied, wherein the at least one functional unit comprises a hydraulic element made of a plurality of flexible polymer films filled with an electrically non-conductive liquid, and wherein the hydraulic element is coated with a flexible and electroconductive gel, wherein at least one of:

at least two functional units are respectively connected in series in their preferential direction to form a fibriform or strand-like functional group, wherein all functional units of a functional group are able to be activated upon energy being supplied such that the total travel of the functional group thereby generated is composed of a sum of all the individual travel of individual functional units of the functional group, and the at least two functional units are arranged parallel to one another such that upon energy being supplied, the total force generated by the at least two parallel-arranged functional units corresponds to a sum of the individual forces able to be generated by the at least two functional units when energy is supplied.

16. The EOAT device according to claim 15, wherein the at least two functional units are formed from a first material having shape memory properties, and wherein the at least two functional units are designed to reversibly change dimensions in the preferential direction of the at least two functional units when heat is supplied.

17. The EOST device according to claim 16, wherein the first material is a dielectric elastomer, a dielectric polymer or a metal alloy, in particular nitinol.

18. The EOAT device according to claim 15, wherein at least two functional units are formed from a second material having piezoelectric properties, and wherein the at least two functional units are designed to reversibly change dimensions in the preferential direction of the at least two functional units upon application of an electrical voltage.

19. The EOAT device according to claim 15, wherein the at least two functional units having polymer properties, and wherein the at least two functional units are designed to reversibly change dimensions in the preferential direction of the at least two functional units upon application of an electrical voltage.

20. The EOAT device according to claim 15, wherein the at least two functional units of a first group contract in the preferential direction of the respective functional units of the first group upon energy being supplied, and wherein the at least two functional units of a second group expand in the preferential direction of the respective functional units of the second group upon energy being supplied.

* * * * *